No. 696,795. Patented Apr. 1, 1902.
N. S. BÖK & T. R. ROBSAHM.
AXIAL FLOW TURBINE.
(Application filed Jan. 25, 1899.)

(No Model.) 2 Sheets—Sheet 1.

WITNESSES:
J. V. Wiman
Peter A. Ross

INVENTORS
Nils S. Bök
Tycho R. Robsahm
BY
Henry Connett
ATTORNEY

THE NORRIS PETERS CO., PHOTO-LITHO., WASHINGTON, D. C.

No. 696,795. Patented Apr. 1, 1902.
N. S. BÖK & T. R. ROBSAHM.
AXIAL FLOW TURBINE.
(Application filed Jan. 25, 1899.)
(No Model.) 2 Sheets—Sheet 2.

A-B.

C-D.

A-B.

C-D.

WITNESSES:
J. H. Hinman
Peter N. Ross

INVENTORS
Nils S. Bök
Tycho R. Robsahm
BY
Henry Connett
ATTORNEY

THE NORRIS PETERS CO., PHOTO-LITHO., WASHINGTON, D. C.

UNITED STATES PATENT OFFICE.

NILS SVENSSON BÖK AND TYCKO REGINALD ROBSAHM, OF STOCKHOLM, SWEDEN.

AXIAL-FLOW TURBINE.

SPECIFICATION forming part of Letters Patent No. 696,795, dated April 1, 1902.

Application filed January 25, 1899. Serial No. 703,356. (No model.)

*To all whom it may concern:*

Be it known that we, NILS SVENSSON BÖK and TYCKO REGINALD ROBSAHM, engineers, subjects of the King of Sweden and Norway, and residents of Stockholm, in the Kingdom of Sweden, have invented certain new and useful Improvements in Axial-Flow Turbines, of which the following is a specification, reference being had therein to the accompanying drawings.

The present invention relates to axial-flow turbines or series or groups thereof and purposes partly the absorption and transmission of a maximum of the energy of the driving fluid in a turbine motor of given diameter by admitting the driving fluid simultaneously at both sides of the turbine wheel or at both ends of a series of wheels at points opposite different rings or circles of vanes or buckets and discharging said driving fluid at the opposite sides of the turbine wheel to that where the corresponding inlet of the same ring or circle of vanes or buckets is located in order that each particle of the fluid may not have to pass but once axially through the driving-wheel and partly to cause the turbine motor to rotate in one direction by admitting the driving fluid on some of the vane-rings only and to cause the motor to rotate in the other direction by allowing said fluid to traverse the rest of the vane-rings only. In the former case all the turbine vanes are turned or curved in the same direction. In the latter case all the vanes in the rings simultaneously struck by the fluid which is to drive the motor in one direction are turned in one direction and all the vanes in the rings simultaneously struck by the fluid intended to effect rotation in the other direction are turned in the opposite direction.

By the "discharge of the fluid" is here meant its entire withdrawal from the turbine, as to the atmosphere or to a condenser.

Figure 1:
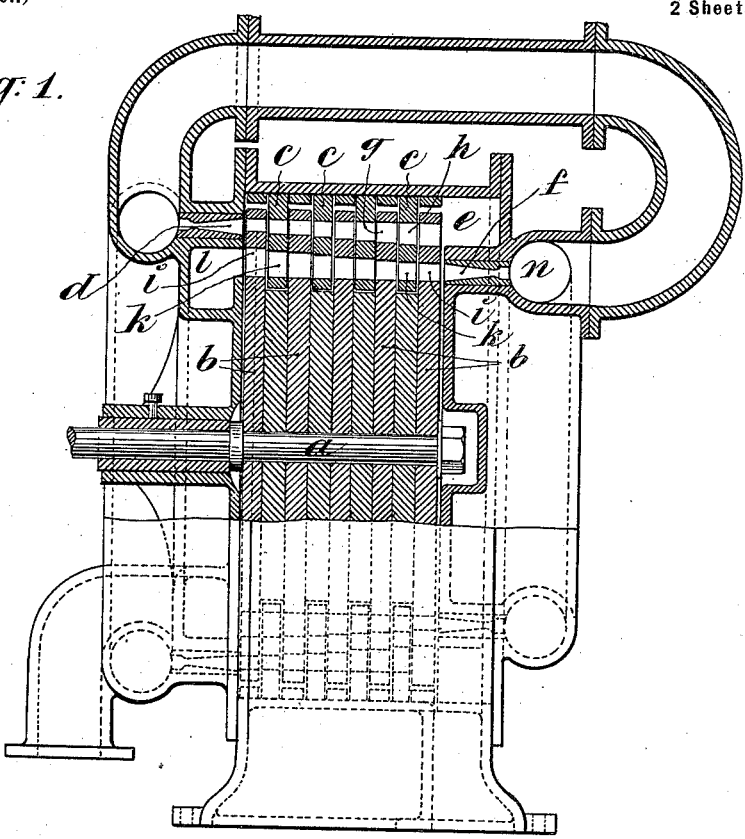
Figure 2:
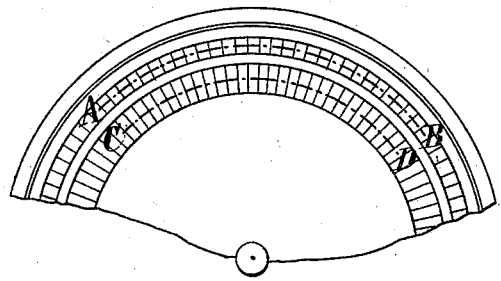
Figure 3:
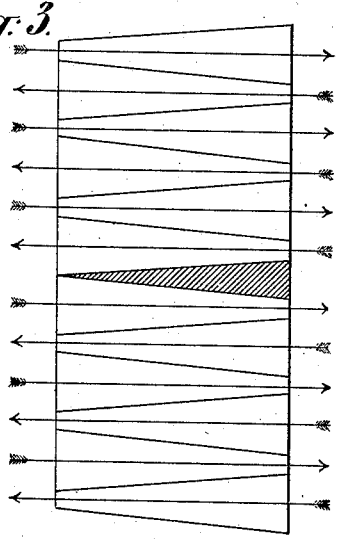
Figure 4:
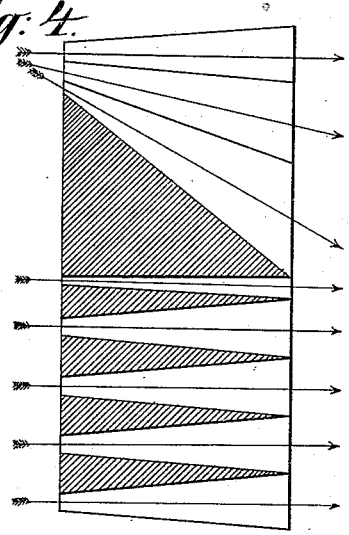
Figure 5:
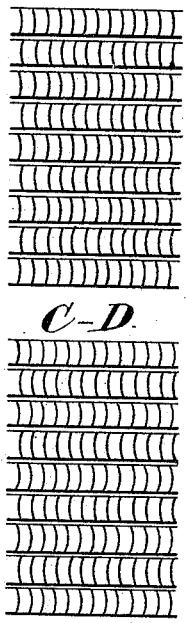
Figure 5:
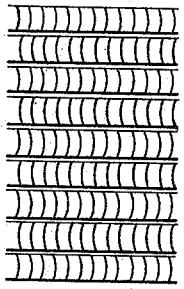
Figure 6:
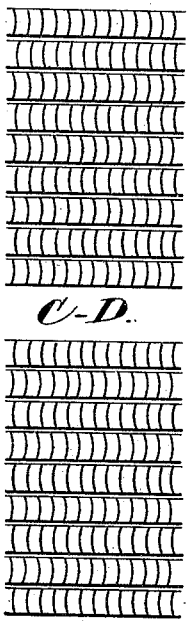

In the accompanying drawings, which illustrate an embodiment of the invention, Figure 1 is a sectional elevation of the turbine, the section being taken vertically along the axis of the same. Fig. 2 is a fragmentary face view of one of the turbine wheels. Figs. 3 and 4 are diagrams illustrating the arrangement of the vanes of axial-flow turbines. Figs. 5 and 6 are diagrams showing the positions of the guide-blades and vanes of the turbine.

The upper part of Fig. 1 is an axial section through a series of turbine wheels $b$, with their guide-rings $c$. By nozzles $d$ at the periphery the driving fluid is admitted from the left-hand side to the rings or circles of vanes and guide-blades $g$ and $h$, respectively, nearest the periphery, the said fluid traversing vanes and guide-blade rings or circles from the left to the right, so that the fluid discharges from the last wheel of the series into the exhaust-passage $e$ at the right-hand side of the motor, while the driving fluid by nozzles $f$ at the right is admitted to and traverses the rings or circles of vanes and guide-blades $i$ and $k$, respectively, in front of them from right to left, and finally is discharged through the passage $l$ at the left-hand side of the series of turbines.

It may be evident without further explanation that, more especially when the turbine diameters are large, several such concentric passages for the driving fluid may be arranged in such a manner that the driving fluid in at least two circles of vanes situated concentrically in the same radial plane, always will run in directions opposite to each other. In Fig. 3 a diagram of the passages between the vanes of such a turbine is shown for the case that as great a portion of the turbine wheel as possible is taken up by passages for the fluid. The directions of flow of the fluid is indicated by the pointing of the arrows. Fig. 4 likewise represents a diagram of an axial-flow turbine wheel having the same size as that in Fig. 3. Here the wheel is also taken up to the greatest possible extent by passages for the fluid. The passages at the upper portion of the wheel are here so placed that all inlets for the fluid are situated at the same end and as far out toward the periphery as is possible, while the areas required for the outlets entirely cover the other end. In the lower half of Fig. 4 the inlets are placed so as to be at the same distance from the center of the turbine wheel as the outlets, as in Fig. 3, with all inlets located at one end, while the outlets entirely cover the other end, as in the upper half of Fig. 4. With reference to the capacity of a given turbine wheel to absorb and transmit a maximum of the energy of the driving fluid, an approximate comparative computation of the different arrangements of passages, as set forth in Figs. 3 and 4, shows that, all other conditions being equal, the turbine in Fig. 3 develops about thirty-three per cent. more power than either of the arrangements represented in Fig. 4, which latter are about equally efficient when compared with each other.

Fig. 5 shows the positions of the guide-blades and vanes of Fig. 1 when the driving fluid is simultaneously admitted from both ends of the series of turbines. The sections are taken on the developed curves A B and C D of Fig. 2. Fig. 6 represents the same sections, but with the vanes and guide-blades so placed that the turbine will move in one direction when the driving fluid is admitted to the outer circles of vanes only and in the opposite direction when the driving fluid is allowed to traverse only the inner circles of vanes.

It will be noted that one of the advantageous results of our construction, wherein the fluid enters from opposite sides, and the exhaust also is at opposite sides, the end pressure or thrust on the shaft is substantially neutralized.

Having now described our invention, what we claim as new, and desire to secure by Letters Patent, is—

An axial-flow turbine having a plurality of concentric circles of buckets situated in the same radial plane, and having for each circle of buckets an inlet for a fully-expanded driving fluid at one side, and a discharge-outlet for same to the exhaust on the opposite side, the inlet for one circle of buckets being situated on the same side with the outlet for another circle, whereby the same driving fluid passes but once axially through the turbine, for the purpose of absorbing and transmitting the maximum energy of the driving fluid with one turbine body, substantially as set forth.

In witness whereof we have hereunto signed our names in the presence of two subscribing witnesses.

NILS SVENSSON BÖK.
TYCKO REGINALD ROBSAHM.

Witnesses:
ERNST SVANQVIST,
HANS B. OHLSSON.